United States Patent
Ainsworth et al.

(10) Patent No.: US 7,623,033 B2
(45) Date of Patent: Nov. 24, 2009

(54) METHODS AND SYSTEMS FOR TRACKING ITEMS USING A SENSOR WEB

(75) Inventors: Miley Ainsworth, Hernando, MS (US); Ole Petter Skaaksrud, Lakeland, TN (US); Randy Jacobs, Collierville, TN (US); Tim Gregory, Collierville, TN (US); Marshall Veitenheimer, Arlington, TN (US)

(73) Assignee: Federal Express Corporation, Memphis, TN (US)

( * ) Notice: Subject to any disclaimer, the term of this patent is extended or adjusted under 35 U.S.C. 154(b) by 529 days.

(21) Appl. No.: 11/453,868

(22) Filed: Jun. 16, 2006

(65) Prior Publication Data

US 2007/0290836 A1    Dec. 20, 2007

(51) Int. Cl.
*G08B 1/08* (2006.01)
*G08B 13/14* (2006.01)
(52) U.S. Cl. .............................. 340/568.1; 340/539.13; 340/539.26; 340/539.22; 340/572.1
(58) Field of Classification Search ............. 340/568.1, 340/539.13, 539.26, 539.22, 572.1, 825.36, 340/825.49, 602, 5.92, 10.1
See application file for complete search history.

(56) References Cited

U.S. PATENT DOCUMENTS

| | | | |
|---|---|---|---|
| 6,507,279 B2 * | 1/2003 | Loof | 340/572.1 |
| 6,600,418 B2 * | 7/2003 | Francis et al. | 340/572.1 |
| 6,901,304 B2 | 5/2005 | Swan et al. | |
| 6,933,849 B2 * | 8/2005 | Sawyer | 340/572.4 |
| 7,119,716 B2 | 10/2006 | Horstemeyer | |
| 7,152,791 B2 * | 12/2006 | Chappidi et al. | 235/385 |
| 7,180,422 B2 * | 2/2007 | Milenkovic et al. | 340/572.4 |
| 2004/0220860 A1 | 11/2004 | Persky et al. | |
| 2005/0200453 A1 * | 9/2005 | Turner et al. | 340/5.61 |
| 2005/0258955 A1 | 11/2005 | Gloekler et al. | |

OTHER PUBLICATIONS

PCT International Search Report for corresponding international application No. PCT/US 07/14041, mailed Sep. 25, 2008.

* cited by examiner

*Primary Examiner*—Toan N Pham
(74) *Attorney, Agent, or Firm*—Finnegan, Henderson, Farabow, Garrett & Dunner, LLP

(57) ABSTRACT

A system and method for tracking items may store in memory first association data reflecting an association between an item tracking device and a beacon device when the item tracking device is within a predetermined range of the beacon device. The item tracking device may correspond to a first item, and the beacon device may correspond to an area that contains multiple items including the first item. Furthermore, the system and method for tracking items may periodically transmit sensor data to a database. The sensor data may be transmitted to the database from the beacon device to provide information about an environment of a group of items from the multiple items within the predetermined range of the beacon device.

25 Claims, 7 Drawing Sheets

METHODS AND SYSTEMS FOR TRACKING ITEMS USING A SENSOR WEB

TECHNICAL FIELD

The present invention generally relates to systems and methods for tracking items. More particularly, the present invention relates to systems and methods for tracking items using a context based sensor web.

BACKGROUND

Asset management has always been an important part of commerce. Tracking assets is important to organizations of all kinds, whether it be a company keeping track of inventory to be sold in its stores, or a package delivery provider keeping track of packages being transported through its delivery network. To provide quality service, an organization typically creates and maintains a highly organized network for tracking its assets. Effective management of such networks allows lower cost, reduced delivery time, and enhanced customer service.

Technological advances have enabled items to be tracked in ways that far exceed the functionality of a simple list. A rich information framework now can be applied to describe the item's interaction with its surroundings, such as transportation and custodial handoffs.

Bar codes are one way organizations keep track of items. A retailer, for example, may use bar codes on items in its inventory. For example, items to be sold in a retailer's store may each have a different bar code on it. In order to keep track of inventory, the retailer typically scans the bar code on each item. In addition, when an item is sold to a consumer, the bar code for that item is scanned.

Similarly, a package delivery provider may utilize bar codes by associating a bar code with packages to be delivered to a recipient. For example, a package may have a bar code corresponding to a tracking number for that package. Each time the package goes through a checkpoint (e.g., the courier taking initial control of the package, the package being placed in a storage facility, the package being delivered to the recipient, etc.), the package's bar code may be scanned. Bar codes, however, have the disadvantage that personnel must manually scan each bar code on each item in order to effectively track the items.

Radio-frequency identification (RFID) tags are an improvement over typical bar codes. RFID tags do not require manual scanning that is required by typical bar codes. For example, in a retail context, an RFID tag on an inventory item may be able to communicate with an electronic reader that detects items in a shopping cart and adds the cost of each item to a bill for the consumer. RFID tags have also been used to track things such as livestock, railroad cars, trucks, and even airline baggage. These tags typically only allow for basic tracking and do not provide a way to improve asset management using information about the environment in which the items are tracked.

Sensor-based tracking systems are also known which can provide more information than RFID systems. Such systems, however, can be expensive, and may provide extraneous and redundant item information.

It is therefore desirable to provide a system that lowers the costs of sensor-based tracking and enables sensor data to be shared in order to build a strong information web surrounding the item being tracked.

SUMMARY

Consistent with embodiments of the present invention, a system and method are disclosed for tracking items. The system and method for tracking items may store in memory first association data reflecting an association between an item tracking device and a beacon device when the item tracking device is within a predetermined range of the beacon device. The item tracking device may correspond to a first item, and the beacon device may correspond to an area that contains multiple items including the first item. Furthermore, the system and method for tracking items may periodically transmit sensor data to a database. The sensor data may be transmitted to the database from the beacon device to provide information about an environment of a group of items from the multiple items within the predetermined range of the beacon device.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
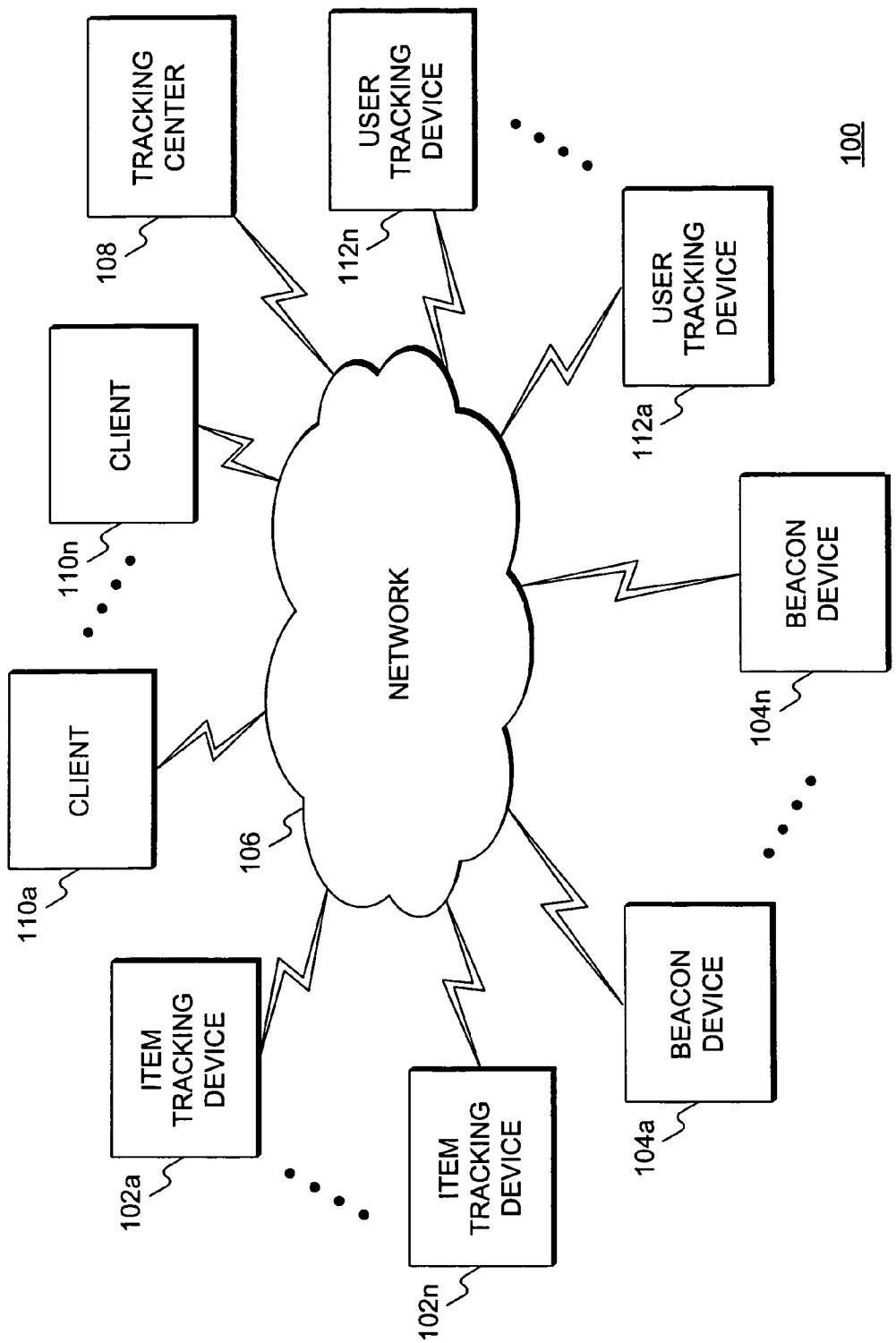
FIG. 1 is a block diagram of an exemplary item tracking system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Overview

Systems and methods consistent with the present invention lower the cost of item tracking, as well as enable sensor data to be shared in order to build a strong information web surrounding the item being tracked. For example, sensor data is integrated with surrounding sensors and/or data sources to drive rule-based logic based on relationships between sensors and associated sensor data. This enables context-based rule-sets to replace the need for conventional tracking solutions and to build much richer information describing the item being tracked.

Leveraging the surrounding environment (e.g., using sensor data from one sensor to describe the environment of multiple items) removes duplication of capture and drives the cost down for each instance of data acquisition. This is particularly true for cases where the sensor data is shared across a large number of items. This data could be the temperature of a room, or location of a building, or a picture of a rainy road.

System Architecture

By way of a non-limiting example, FIG. 1 illustrates a network environment 100 in which the features and principles of the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Network environment 100 may include item tracking devices 102a-102n, beacon devices 104a-104n, network 106, tracking center 108, and clients 110a-110n.

Network 106 provides communications between the various entities depicted in network environment 100. Network 106 may be a shared, public, or private network and encompass a wide area or local area. Network 106 may be implemented through any suitable combination of wired and/or wireless communication networks (including Wi-Fi networks, GSM/GPRS networks, TDMA networks, CDMA networks, Bluetooth networks, or any other wireless networks) By way of example, network 106 may be implemented through a wide area network (WAN), local area network (LAN), an intranet and/or the Internet. Further, the entities of network environment 100 may be connected to multiple networks 106, such as, for example, to a wireless carrier network, a private data network and the public Internet.

Item tracking devices 102a-102n may be devices for use in tracking various items, and they may be attached to or included in the items that are to be tracked. For example, an item tracking device 102a may be attached to or enclosed in a package that is being sent to a recipient using a delivery service such as Federal Express Inc., ("FedEx"). Alternatively, an item tracking device 102a may be attached to or enclosed in a container holding inventory being delivered to a retailer. The aforementioned items are exemplary and may comprise any deliverable elements.

An item tracking device 102a may store information associated with an item tracking number for a corresponding item. The item tracking number may be a FedEx tracking number or similar tracking number. An item tracking device 102a may also store information indicative of other item tracking devices and/or beacon devices which are currently within a given proximity. For example, when an item with a corresponding item tracking device 102 is placed inside a vehicle or storage facility that includes a beacon device 104, the item tracking device 102 and/or the beacon device may sense that the item tracking device 102 is within a proximity that indicates that the corresponding item is now in the vehicle or storage facility. Information reflecting an association between the beacon device 104 and item tracking device 102 may then be stored in a memory located at one or more of the item tracking device 102, the beacon device 104, or the tracking center 108.

In one embodiment, an item tracking device 102 may be capable of measuring or detecting one or more conditions such as location, temperature, light level, motion, pressure, humidity, gas level, airflow, vibrations, or other environmental conditions. Alternatively, item tracking device 102 may be a low cost device that does not detect such environmental conditions.

An item tracking device 102 may also have the ability to directly transmit and receive information to/from tracking center 108 via network 106 (e.g., using known wireless communications means). Alternatively, item tracking device 102 may first send the information to a nearby beacon device 104, which, in turn, would next transmit the information to tracking center 108. For example, item tracking devices 102 may be implemented using sensor devices such as wireless sensors available from Crossbow Technology. One of ordinary skill in the art will appreciate that alternative sensor devices may be used.

Beacon devices 104a-104n are devices capable of wirelessly communicating both to item tracking devices 102 and tracking center 108. In addition beacon devices 104a-104n may also be able to communicate with other beacon devices. Beacon devices 104a-104n may be located in various sites along the delivery path of an item. For example, vehicles driven by couriers may have beacon devices 104 associated with them. Airplanes used to transport items may also have beacon devices 104 associated with them. Additionally, storage facilities may have beacon devices 104 associated with them. One of ordinary skill in the art will appreciate that these locations of beacon devices 104 are only exemplary.

In one embodiment, a beacon device 104 may include a sensor that measures or detects one or more conditions such as location, temperature, light level, motion, pressure, humidity, gas level, airflow, vibrations, or other environmental conditions. Alternatively, a beacon device may not include such a sensor. Beacon devices 104 may periodically report detected sensor data to tracking center 108 via network 106 (e.g., using known wireless communications means).

A beacon device 104 may be operable to periodically determine whether there are any item tracking devices 102 within a certain proximity of the beacon sensor 104. For example, a beacon sensor 104a located inside a delivery truck may periodically check whether there are any item tracking devices 102 within a predetermined distance of the beacon sensor 104a by listening for signals from the item tracking devices 102. Such a signal may be a wireless signal periodically sent out by an item tracking device 102. In this manner, item tracking device 102 essentially periodically declares "I am here." One of ordinary skill in the art will appreciate that a beacon device 104 may use other ways of detecting the item tracking devices 102 within the predetermined distance.

The predetermined distance in this example is set so that item tracking devices 102 that are within the distance are presumed to be inside or very nearby the truck. Item tracking devices 102 outside of the distance are considered outside of the truck. When a beacon device 104 determines that an item tracking device 102 is within its range, it may store information indicative of an association between the two devices. Association information, for example, may include data that indicates that a beacon device's (104) specific identification number corresponds to an item tracking device's (102) specific identification number. The beacon device may also periodically send such association information to tracking center 108 via network 106 (e.g., beacon device 104 may periodically send tracking center 108 information indicative of each of its current associations with item tracking devices 102). When a beacon device 104 determines that an item tracking device is no longer within its range, it may update the stored information resident at beacon device 104 and tracking center 108 to reflect that the devices are no longer associated with each other. For example, when a beacon device 104a checks for item tracking devices within its range, there may be an item tracking device 102a that was previously within range but is not any longer. When that beacon device 104a locally stores and subsequently reports its current associations to tracking center 108, the current association information no longer shows that item tracking device 102a is currently associated with beacon device 104a.

Tracking center 108 provides a platform for tracking items being delivered to a recipient. Tracking center 108 may be implemented using a combination of hardware, software, and/or firmware, and may be operable to receive and store sensor data from various item tracking devices 102 and/or beacon devices 104. For example, a beacon device 104a may periodically send tracking center 108 sensor data reflecting conditions measured or detected by beacon device 104a. Such sensor data may include location, temperature, light level, motion, pressure, humidity, gas level, airflow, vibrations, or other environmental conditions. Tracking center 108 may also be operable to receive and store information indicative of associations (e.g., devices 102 in the truck are associated with beacon device 104a) between beacon devices 104, item tracking devices 102, and user tracking devices 112. For example, a beacon device 104a that is resident in a delivery truck may send tracking center 108 information that identifies item tracking devices 102 in the truck.

Tracking center 108 is also operable to respond to requests for sensor data. For example, a customer may use a client 110 to enter a request for sensor data stored at tracking center 108. The request may include one or more triggering parameters, which can be used to find the requested sensor data. Exemplary triggering parameters may include a sensor identification number, item tracking number, location, temperature, light level, humidity, pressure, gas level, airflow, vibrations, etc. Accordingly, by way of example, a customer may request temperature measurements within a certain range of a specific location. The distance from the specific location is the triggering parameter in that case.

When tracking center 108 receives a request for sensor data from a client 110, tracking center 108 may search a database resident at tracking center 108 and return the requested sensor data, if found. Access to the sensor data may be managed or open. For example, if access is managed, the client 110 and/or the customer would need to be authenticated before sensor data is made available to the client 110 and/or the customer. In addition to or instead of searching a database for sensor data, tracking center 108 may request sensor data directly from the relevant item tracking devices 102 and/or beacon devices 104.

Tracking center 108 may also provide updated and/or new programming for item tracking devices 102, beacon devices 104, and user tracking devices 112. Programming, for example, may specify the manner in which a device senses environmental conditions. Programming of the aforementioned devices may be altered, for example, by storing new or modified instructions in a memory (not shown) located at the respective device. Programming changes may be made arbitrarily (e.g., at the discretion of a programmer) or in response to a detected condition. For example, suppose a beacon device 104a detects a temperature above a certain level. When beacon device 104a reports the temperature level to tracking center 108, an alarm or alert may be triggered to bring this information to the attention of personnel associated with tracking center 108. Tracking center 108, in turn, may alter the programming of beacon device 104a to check the temperature more frequently. One of ordinary skill in the art will appreciate that other parameters can be used as the basis for altering programming.

Clients 110a-110n provide users with an interface to network 106. By way of example, clients 110a-110n may be implemented using any device capable of accessing a data network, such as a general purpose computer or personal computer equipped with a modem or other network interface. Clients 110a-110n may also be implemented in other devices, such as a Blackberry™, Ergo Audrey™, mobile phones (with data access functions), Personal Digital Assistant ("PDA") with a network connection, IP telephony phone, or generally any device capable of communicating over a data network.

Clients 110a-110n may be utilized by users to request sensor data from tracking center 108. For example, a user may subscribe to a service that allows the user to access up-to-date information about one or more sensors. Alternatively, a subscription to a service is not necessary to access the information. In order to request sensor data, the user may enter information on a client 110a indicative of the desired sensor data. For example, the user may enter information requesting the current location and temperature of all sensors within a certain radius of a specified sensor. After the customer enters this information, the client 110a may send a request to tracking center 108, which in turn may search its database or request the information directly from the sensors. When tracking center 108 finds the requested information, it may send the information back to client 110a.

In one embodiment, the user may enter the information to be searched for on a web page associated with a search engine. For example, the user may use a popular search engine such as Google™. More information on the use of a search engine in this manner is provided below in the discussion of FIGS. 6 and 7. Alternatively, the customer or user may enter the information using an application program resident on the client 110.

User tracking devices 112 may be devices, similar to beacon devices 104, that are capable of communicating to both item tracking devices 104 and tracking center 108. Instead of being located in places such as a vehicle, user tracking devices 112 are attached to or placed near specific users themselves. A user may be, for example, a courier that is responsible for delivery of the item being tracked, a recipient to whom an item is being delivered, a sender that is sending an item to a recipient, or any other people otherwise involved in the delivery and/or tracking processes. A user tracking device 112 may include a sensor that measures or detects one or more conditions such as location, temperature, light level, motion, pressure, humidity, gas level, airflow, vibrations, or other environmental conditions. Alternatively, a user tracking device may not include such a sensor. User tracking devices 112 may periodically report detected sensor data to tracking center 108 via network 106 (e.g., using known communications means).

A user tracking device 112 may be operable to periodically determine whether there are any item tracking devices 102 within a certain proximity of the user tracking device 112. When the user tracking device 112 determines that an item tracking device 102 is within its range, it may store information indicative of an association between the two devices. The user tracking device 112 may also send this information to tracking center 108 via network 106. When a user tracking device 112 determines that an item tracking device is no longer within its range, it may update the stored information resident at user tracking device 112 and tracking center 108 to reflect that the devices are no longer associated with each other (e.g., sensor data from user tracking device 112 may no longer be used to learn about the environment of the item tracking device).

Figure 2:
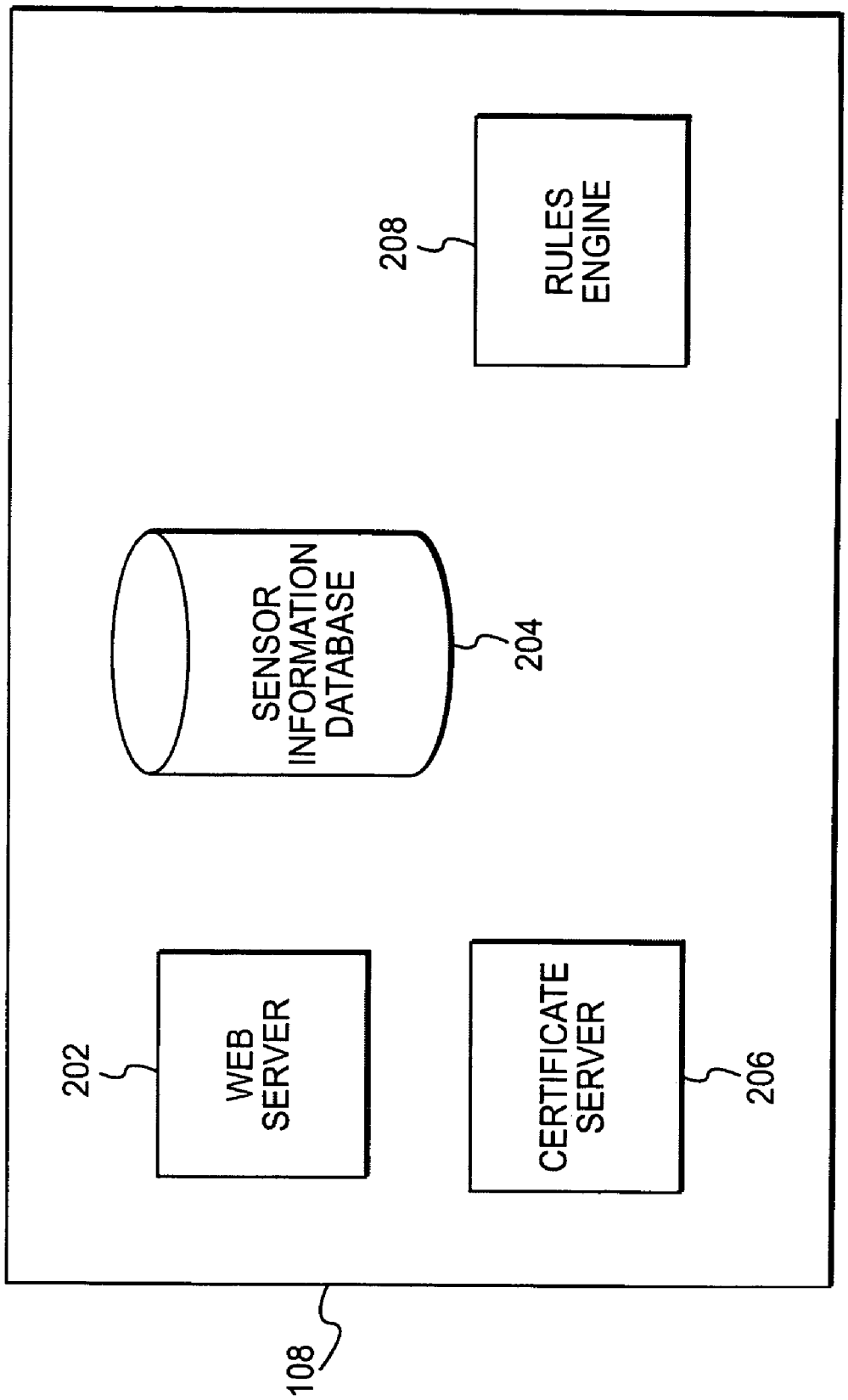
FIG. 2 is a block diagram of an exemplary tracking center consistent with an embodiment of the present invention.

FIG. 2 is a diagram of an exemplary tracking center consistent with the present invention. Tracking center 108 may include at least a web server 202, a sensor information database 204, a certificate server 206, and a rules engine 208. The number of components in tracking center 108 is not limited to what is shown and other variations in the number of arrangements of components are possible, consistent with embodiments of the invention.

Web server 202 provides functionality for receiving traffic over a network. For example, web server 202 may be a standard web server that a user may access at a client 110 using a web browser program, such as Internet Explorer or Netscape Communicator. Web server 202 is operable to receive requests for sensor data from clients, and pass the requests on to sensor information database 204, certificate server 206, and/or rules engine 208 for processing.

Sensor information database 204 stores sensor data received from various item tracking devices 102, beacon devices 104, and user tracking devices 112. Sensor information database 204 may also store information indicative of associations between a beacon device 104 and item tracking devices 102, information indicative of associations between different item tracking devices 102, as well as information indicative of associations between a user tracking device 112 and item tracking devices 102.

For example, a beacon device, such as beacon device 104a may periodically send sensor data to tracking center 108, where it is stored in sensor information database 204. Exemplary sensor data may include location, temperature, light level, motion, pressure, humidity, gas level, airflow, vibrations, or other environmental conditions. Sensor data that is transmitted to sensor information database 204 may be accompanied by information identifying the item tracking device 102, beacon device 104, or user tracking device 112 that detected the sensor data.

Association data stored by sensor information database 204 may also be periodically sent by a beacon device 104, an item tracking device 102, or a user tracking device 112. For example, when an activated item tracking device 102 is placed within a predetermined proximity of a beacon device 104, item tracking device 102 and/or beacon device 104 may locally store information reflecting this association. Beacon device 104 may then send tracking center 108 information indicative of the association. Additionally or alternatively, item tracking device 102, may send tracking center 108 information indicative of the association.

When tracking center 108 receives a request for sensor data from a client 110, sensor information database 204 may be searched for the requested data. If that data is found, it may be sent back to client 110.

Certificate server 206 may be operable to control access to data resident in sensor information database 204. For example, a client 110a or a user of a client 110a may only be authorized to receive sensor data that corresponds to certain item tracking devices 102 and/or certain beacon devices 104. When that user requests a set of sensor data that includes data for which the client or user has no authorization to access, certificate server 206 recognizes the lack of authorization and only allows tracking center 108 to send the client or user the portion of the requested sensor data for which the client or user has authorization.

Rules engine 208 may be operable to, among other things, send queries to sensor information database 204 based on requests for sensor data from clients 110; send requested sensor data to clients 110 after receiving it from sensor information database 204; process sensor data received from item tracking devices 102, beacon devices 104, and/or user tracking devices 112 (and take appropriate actions); request sensor data from item tracking devices 102, beacon devices 104, and/or user tracking devices 112; and alter the programming of various item tracking devices 102, beacon devices 104, and/or user tracking devices 112.

System Operation

Figure 3:
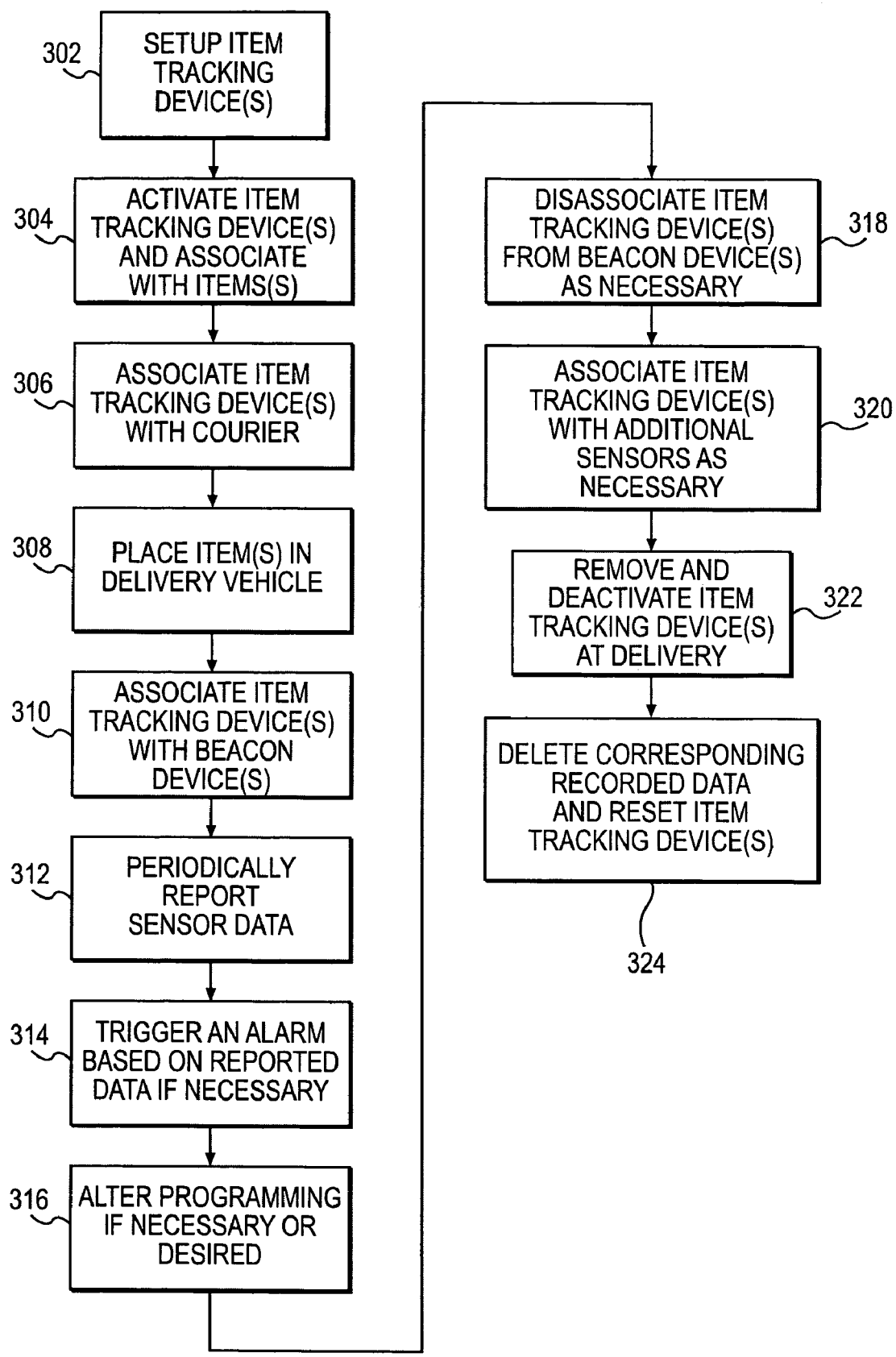
FIG. 3 is a flowchart of an exemplary method for tracking items consistent with an embodiment of the present invention.

FIG. 3 shows a flowchart of an exemplary method for tracking items, consistent with the principles of the present invention. Although the steps of the flowchart are described in a particular order, one skilled in the art will appreciate that these steps may be performed in a modified or different order, or that certain steps may be omitted. Further, one or more of the steps in FIG. 3 may be performed concurrently or in parallel.

One or more item tracking devices 102 are set up based on the requirements of a shipper (step 302). For example, an organization may require specific programming (dictating, for example, the manner in which a device detects environmental conditions) for item tracking devices 102 that are to be associated with items to be sent to recipients. Alternatively, item tracking devices 102 may be setup based on default programming. A customer who desires to send an item to a recipient may purchase or otherwise acquire an item tracking device to be attached to or placed in an item to be shipped. A shipper, for example, may be an item delivery company such as FedEx, a retailer, or a manufacturer that makes its own deliveries. One of ordinary skill in the art will appreciate that it is possible that the customer and the shipper are the same entity.

The item tracking device(s) may be activated and associated with the item(s) being shipped (step 304). For example, a courier or other employee of the shipper may turn on an item tracking device 102a and place it in or attach it to packaging associated with a corresponding item. The courier or other employee may also associate the item tracking device 102a with an item tracking number. For example, the courier or other employee may cause information to be stored at tracking center 108 that specifies that the item tracking number is currently assigned to an identification number for the item tracking device. Alternatively, no item tracking number is associated with the item tracking device 102a.

Once an item tracking device 102 has been activated, in cases where the courier has a user tracking device 112, the item tracking device 102 may then be associated with the user tracking device 112 (step 306). For example, the user tracking device 112 and/or the item tracking device 102 may automatically detect when the user tracking device 112 comes within a certain distance of the item tracking device 102. The user tracking device 112 may store information reflecting its association with the item tracking device 102. In addition, the user tracking device 112 may forward this information to tracking center 108 for storage.

After an item is placed in a delivery vehicle (step 308), the item tracking device 102 for the item is associated with a beacon device 104 that corresponds to the delivery vehicle (step 310). For example, the item tracking device 102 and/or the beacon device 104 may detect that the item tracking device 102 is within a predetermined distance of the beacon sensor 104 that indicates that the corresponding item is now in or very nearby the vehicle. Information reflecting the association between the item tracking device 102 and the beacon device 104 may be stored in the item tracking device 102 and/or the beacon device 104. Association information, for example, may include data that indicates that a beacon device's (104) specific identification number corresponds to an item tracking device's (102) specific identification number. The beacon device 104 or the item tracking device 102 (when it has the ability to do so) may also send this information to tracking center 108 via network 106. One of ordinary skill in the art will appreciate that a vehicle may refer to a truck, van, airplane, boat, or any other mobile vehicle used to transport an item to a recipient. One of ordinary skill in the art will also appreciate that an item tracking device 102 may also be associated with beacon devices located in places other than a vehicle, such as a storage facility or item processing facility (e.g., when a corresponding item is placed in a such a site).

By allowing an item tracking device to associate with a beacon device in this manner, tracking system 108 can leverage (e.g., use sensor data from one device to describe the environment of multiple items) sensor data from the beacon device to provide more information on the environment of the item being tracked than was previously possible. For example, suppose an item tracking device 102*a* does not have the ability to sense temperature but beacon device 104*a* does. Also suppose that item tracking device 102*a* is associated with beacon sensor 104*a* by virtue of being located in a vehicle with beacon sensor 104*a*. A user that later attempts to find temperature information that corresponds to item tracking device 102*a* may do so even though item tracking device 102*a* cannot sense temperature, because beacon device 104*a* can sense temperature and is associated with item tracking device 102*a*. One of ordinary skill in the art will appreciate that similar leveraging may occur between item tracking devices and user tracking devices.

As noted above with reference to FIG. 1, some item tracking devices 102, beacon devices 104, and user tracking devices 112 may include sensors that measure or detect one or more conditions such as location, temperature, light level, motion, pressure, humidity, gas level, airflow, vibrations, or other environmental conditions. Item tracking devices 102, beacon devices 104, and user tracking devices 112 that include such sensors periodically report sensor data to tracking center 108 (step 312). An item tracking device 102 that includes a sensor and does not have the ability to directly transmit and receive information to/from tracking center 108 via network 106 may first send the sensor data to a nearby beacon device 104 or user tracking device 112, which in turn would send the sensor data to tracking center 108.

When tracking center 108 receives sensor data, if that data is indicative of a predetermined condition, tracking center 108 may trigger an appropriate alarm (step 314). For example, suppose a beacon device 104*a* detects a temperature above a certain level. When beacon device 104*a* reports the temperature level to tracking center 108, an alarm or alert may be triggered to bring this information to the attention of personnel associated with tracking center 108. Personnel may then monitor the situation more closely or take another appropriate action. Alternatively or additionally, the pertinent courier or other user may be notified of the alarm condition via a user tracking device 112. One of ordinary skill in the art will appreciate that instead of tracking center 108 detecting the alarm condition, an item tracking device, beacon devices 104, or user tracking devices 112 may recognize the alarm condition. Suitable notification may thereafter be sent to tracking center 108 and/or the pertinent user tracking device 112.

Tracking center 108 may also alter the programming of an item tracking device 102, beacon devices 104, or user tracking devices 112 if necessary or desired (step 316). In the example of a beacon device 104*a* detecting a temperature above a certain level, tracking center 108 may, in turn, alter the programming of beacon device 104*a* to check the temperature more frequently. One of ordinary skill in the art will appreciate that other parameters can be used as the basis for altering programming. Moreover, one of ordinary skill in the art will appreciate that programming may be altered for reasons other than the detection of predetermined conditions, and that the programming of the aforementioned devices may be altered without the intervention of tracking center 108.

As an item proceeds in a delivery network, item tracking devices are disassociated from beacon devices as necessary (step 318). For example, when an item tracking device 102 is moved out of range of a beacon device 104 with which it is associated, any record that reflects the association between the item tracking device 102 and the beacon device 104 is deleted. This includes any records resident at the item tracking device 102, beacon device 104, and tracking center 108. Such a disassociation may occur, for example, when an item is removed from a delivery vehicle that includes a beacon device, when an item is removed from a storage facility that includes a beacon device, etc. For example, when a beacon device 104*a* checks for item tracking devices within its range, there may be an item tracking device 102*a* that was previously within range but is not any longer. When that beacon device 104*a* locally stores and subsequently reports its current associations to tracking center 108, the current association information no longer shows that item tracking device 102*a* is currently associated with beacon device 104*a*.

In one embodiment, even when an item tracking device 102 is disassociated with a beacon device 104, it may still be possible to continue tracking the item that corresponds to the item tracking device 102. For example, a user tracking device 112 may still be associated with the item tracking device 102, so that conditions sensed by the user tracking device 112 can be leveraged to learn more about the environment of the item. By way of example, when a courier removes a specific item from a vehicle, a corresponding item tracking device 102*a* may be disassociated from a beacon device 104*a* that corresponds to the vehicle. The item tracking device 102*a*, however, may still be associated with a user tracking device 112*a* attached to the courier. If the user tracking device 112*a* has the ability to determine its location (e.g., GPS or similar ability), then that location information may be used as location information for the item tracking device 102*a*. Moreover, if the location information is determined to be close to the recipient's address, then the user tracking device 112*a* may send information to tracking center 108 to that effect. Thereafter, tracking center 108 may send the recipient or another user (e.g., via a client 110) a notification that the item is about to be delivered.

Item tracking devices may also be associated with additional beacon devices or item tracking devices as necessary (step 320). For example, when an item tracking device is moved into range of a beacon device 104 with which it is not currently associated, information reflecting an association between the item tracking device and beacon device may be stored in the item tracking device 102 and/or the beacon device 104. Association information, for example, may include data that indicates that a beacon device's 104 specific identification number corresponds to an item tracking device's 102 specific identification number. The beacon device 104 or the item tracking device 102 (when it has the ability to do so) may also send this information to tracking center 108 via network 106.

In one embodiment, an item tracking device 102 may be associated with another item tracking device 102 when the two devices are within a certain range of each other. An example of when it may be necessary for two item tracking devices to associate with each other is when a first item tracking device 102a is attached to an item that is within the intended association range of a beacon device 104a but cannot detect that it is within range due to low battery power or some other reason. A second item tracking device 102b also within association range of the beacon device may be closer to the beacon device 104a than the first item tracking device 102a, yet still close enough to the first item tracking device 102a for the first item tracking device 102a to detect. In that case, information reflecting the first item tracking device's 102a association with the second item tracking device 102b may be stored at one or more of the first item tracking device 102a, the second item tracking device 102b, the beacon device 104 (which may receive the information via the second item tracking device), and tracking center 108. This association information, for example, may include data that indicates that identification number of item tracking device's 102a corresponds to the identification number of item tracking device's 102b.

When an item reaches its final destination (e.g., delivered to the recipient), the courier removes and deactivates the item tracking device (step 322). Thereafter, tracking center 108 deletes recorded data that corresponds to the item tracking device and resets the item tracking device (step 324). For example, the courier or other personnel may send or otherwise provide information to tracking center 108 identifying a recently deactivated item tracking device. Tracking center 108 may then proceed to search database 204 for entries that correspond to the item tracking device and delete them.

Figure 4:
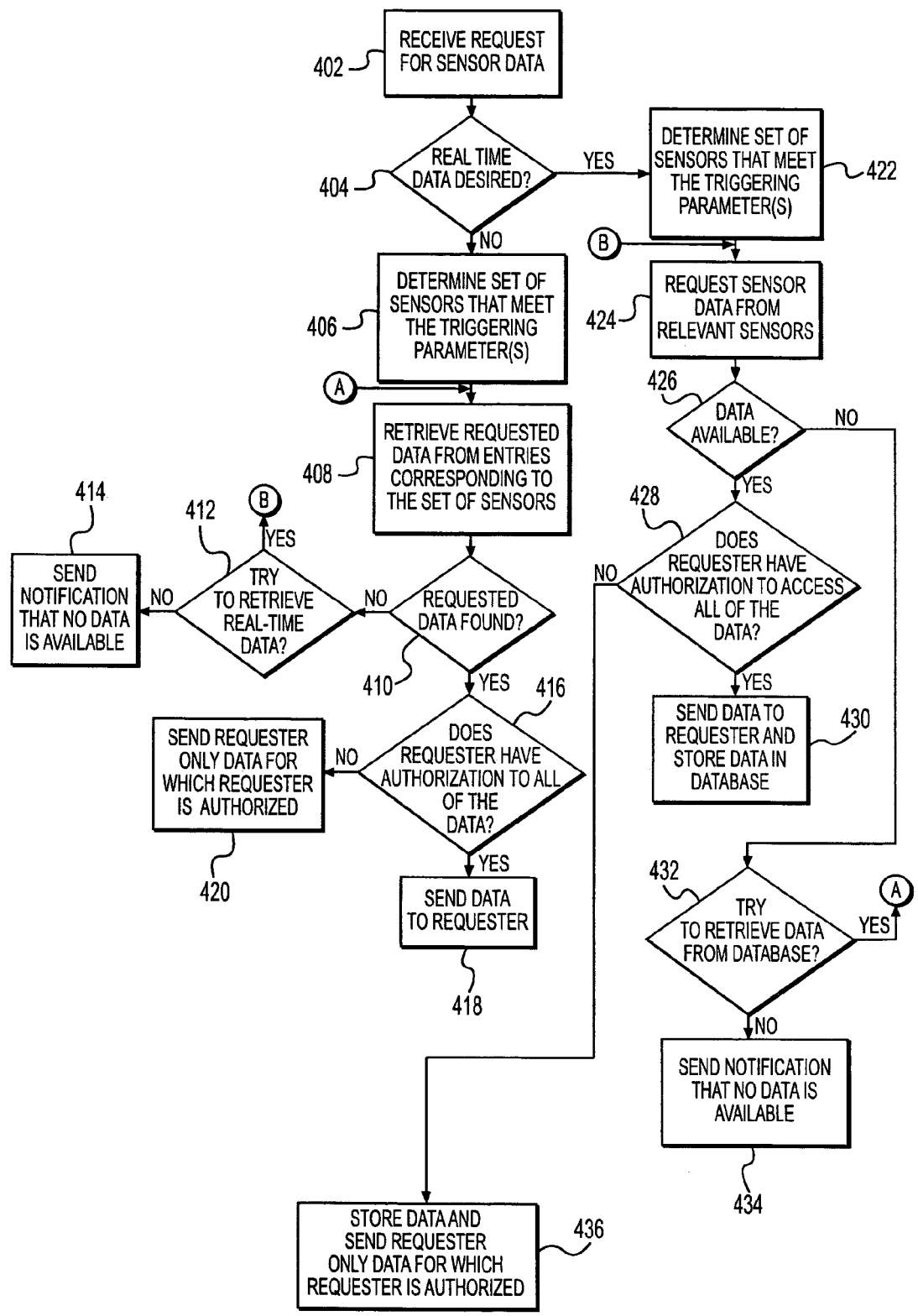
FIG. 4 is a flowchart of an exemplary method for accessing sensor data using a context-based sensor network consistent with an embodiment of the present invention.

FIG. 4 shows a flowchart of an exemplary method for accessing sensor data using a context-based sensor network, consistent with an aspect of the present invention. Although the steps of the flowchart are described in a particular order, one skilled in the art will appreciate that these steps may be performed in a modified or different order, or that certain steps may be omitted. Further, one or more of the steps in FIG. 4 may be performed concurrently or in parallel.

Tracking center 108 may receive a request for sensor data (step 402). A user may enter the request for sensor data using a client 110. For example, the user may enter a request for the current location and temperature of all sensors within a certain radius of a specified sensor. After the user enters this request, the client 110 may send it to tracking center 108. Alternatively, a user may enter a request for sensor data using a computer resident at tracking center 108.

Once tracking center 108 has received the request, it may determine whether real-time sensor data is needed (step 404). For example, a request received at tracking center 108 from a client 110 may be forwarded to rules engine 208 from web server 202. Rules engine 208 may process the request and determine that it requires real-time data as opposed to data stored in sensor information database 204. Such a determination may be made, for example, based on the type of information requested, user choice, the programming of rules engine 208, or an application being run on client 110.

If real-time data is needed, then processing continues to step 422, which is explained in more detail below. If real-time data is not needed, then tracking center 108 may proceed to determine a set of sensors that meet one or more triggering parameters (step 406). These triggering parameters are included as part of the request for sensor data. For example, rules engine 208 may examine the request to ascertain the triggering parameter(s). Thereafter, rules engine 208 may search sensor information database 204 for information that identifies the item tracking devices 102, beacon devices 104, and/or user tracking devices 112 that meet the criteria set forth by each triggering parameter. For example, if the request is for temperature information from sensors within a 2 mile radius of a specified item tracking device 102a, then rules engine 208 looks for the item tracking devices 102, beacon devices 104, and/or user tracking devices 112 that are indicated as being within a 2 mile radius of the item tracking device 102a.

If, for example, the item tracking device 102a does not have the ability to determine location, the location may still be determined by looking up association data in information database 204 that corresponds to the item tracking device 102a in order to find an associated beacon device 104 or user tracking device 112. Accordingly, assuming the associated beacon device 104 or user tracking device 112 can determine location, a location that corresponds to the associated item tracking device may be determined. Thereafter, continuing with the example, rules engine 208 may determine what devices are within a 2 mile radius of that location.

Once the appropriate set of sensors has been determined, tracking center 108 may attempt to retrieve the requested sensor data from entries corresponding to the set of sensors (step 408). For example, rules engine 208 may search sensor information database 204 for entries corresponding to the aforementioned set of sensors. Entries with the requested sensor data are set aside as part of a results set. For example, continuing with the example of a request for temperature information from sensors within a 2 mile radius of a specified location, rules engine 208 may access entries in sensor information database 204 that correspond to the set of sensors that are within a 2 mile radius of the location. Temperature information from those entries may be made part of the results set. One of ordinary skill in the art will appreciate that sensor data from a beacon device 104 or user tracking device 112 may be leveraged (e.g., use sensor data from one device to describe the environment of multiple items) to determine the temperature information for sensors in the set of sensors that cannot detect temperature. One of ordinary skill in the art will also appreciate that the aforementioned hypothetical is only exemplary, and that any combination of triggering parameters and requested sensor data may be used.

If the requested sensor data is not found in sensor information database 204 (step 410—No), then a decision is made as to whether tracking center 108 should attempt to retrieve real-time data (step 412). If so, then processing may proceed to step 424, which is explained in more detail below. If not, then tracking center 108 may send a notification that the requested sensor data is not available (step 414). For example, in the case where the request for sensor data was initiated at a client 110, rules engine 208 may generate such a notification and send it to an appropriate client 110 via web server 202 and network 106.

If, after step 408, the requested sensor data was successfully found (step 410—Yes), then tracking center 108 determines whether the requester has authorization to access all of the retrieved data (step 416). For example, certificate server 206 may interact with sensor information database 204, rules engine 208, and/or a client 110 that originated the request in order to make this determination. Certificate server 206 may receive the request, which may include authentication information. Based on this authentication information, certificate server 206 may determine what portion, if any, of the sensor data included in the results set, the requester has the right to access.

If the requester has access rights for all of the sensor data in the results set, then all of the data is sent to the requester (step 418). For example, in a situation where a user of a client 110 has such access rights, all of the requested sensor data is returned to the client 110, where it may be displayed for viewing by the user. If the requester has access rights to only a portion of the sensor data, or no access rights at all for this data, then the requester is sent only that data for which the requester is authorized (step 420). For example, if a user of a client 110 has access rights to only half of the requested sensor data, only that half of the data is returned to the client 110, where it may be displayed for viewing by the user. One of ordinary skill in the art will appreciate that if the user in this example does not have access rights for any of the requested sensor data, no data from the results set is returned to the client 110.

Returning to step 404, when it is determined that real-time data is desired (step 404—Yes), tracking center 108 determines a set of sensors that meet one or more triggering parameters (step 422). As previously noted, these triggering parameters are included as part of the request for sensor data. Rules engine 208, for example, may examine the request to determine the triggering parameter(s). Thereafter, rules engine 208 may search sensor information database 204 for information that identifies the item tracking devices 102, beacon devices 104, and/or user tracking devices 112 that meet the criteria set forth by each triggering parameter. For example, if the request is for temperature information from sensors within a 2 mile radius of a specified item tracking device 102a, then rules engine 208 looks for the item tracking devices 102 and/or beacon devices 104 that are indicated as being within a 2 mile radius of the specified item tracking device 102a.

Alternatively, tracking center 108 may attempt to determine the set of relevant sensors by requesting information directly from item tracking devices 102, beacon devices 104, and user tracking devices 112. In the example of a request for temperature information from sensors within a 2 mile radius of a specified item tracking device 102a discussed above, rules engine 208 (or, more generally, tracking center 108) may initiate requests to the various item tracking devices 102, beacon devices 104, and user tracking devices 112 asking for location information. After rules engine 208 receives location information from the various devices, it may determine which of those devices are within a 2 mile radius of the specified item tracking device 102a.

Once the appropriate set of sensors has been determined, tracking center 108 may ask for the requested sensor data from the item tracking devices 102, beacon devices 104, and user tracking devices 112 that are part of the set (step 424). For example, rules engine 208 may request the sensor data directly from the devices 102, 104, and 112 identified in step 422. Sensor data received back from the set of devices 102, 104, 112 are made part of a results set. For example, continuing with the example of a request for temperature information from sensors within a 2 mile radius of a specified item tracking device 102a, rules engine 208 may request temperature information from the item tracking devices 102 and beacon devices 104 that have been previously identified as being within a 2 mile radius of the location. Temperature information from those devices may be made part of the results set. Although steps 422 and 424 have been shown as separate steps, one of ordinary skill in the art will appreciate that parts of these steps may occur simultaneously. For example, when tracking center 108 sends a request to item tracking devices 102, beacon devices 104, and user tracking devices 112 in an attempt to identify devices that meet the triggering parameter(s), the request may also be for the desired sensor data. In this manner, it is not necessary for tracking center 108 to send a separate request for the data.

If the requested sensor data is not available from the identified item tracking devices 102, beacon devices 104, and user tracking devices 112 (step 426—No), then a decision is made as to whether tracking center 108 should attempt to retrieve the data from sensor information database 204 (based, for example, on the type of sensor data that is requested) (step 432). If so, then processing may proceed to step 408, described above. If not, then tracking center 108 may send a notification that the requested sensor data is not available (step 434). For example, in the case where the request for sensor data was initiated at a client 110, rules engine 208 may generate such a notification and send it to an appropriate client 110 via web server 202 and network 106.

If the requested sensor data is available (step 426—Yes), then tracking center 108 determines whether the requester has authorization to access all of the retrieved data (step 428). For example, certificate server 206 may interact with sensor information database 204, rules engine 208, and/or a client 110 that originated the request in order to make this determination. Certificate server 206 may receive the request, which may include authentication information. Based on this authentication information, certificate server 206 may determine what portion, if any, of the sensor data included in the results set, the requester has the right to access.

If the requester has access rights for all of the sensor data in the results set, then all of the data is sent to the requester and stored in sensor information database 204 (step 430). For example, in a situation where a user of a client 110 has such access rights, all of the requested sensor data is returned to the client 110, where it may be displayed for viewing by the user. If the requester has access rights to only a portion of the sensor data, or no access rights at all for this data, then the all of the sensor data is stored in sensor information database 204, and the requester is sent only that data for which the requester is authorized (step 436). For example, if a user of a client 110 has access rights to only half of the requested sensor data, only that half of the data is returned to the client 110, where it may be displayed for viewing by the user. One of ordinary skill in the art will appreciate that if the user in this example does not have access rights for any of the requested sensor data, no data from the results set is returned to the client 110.

Figure 5:
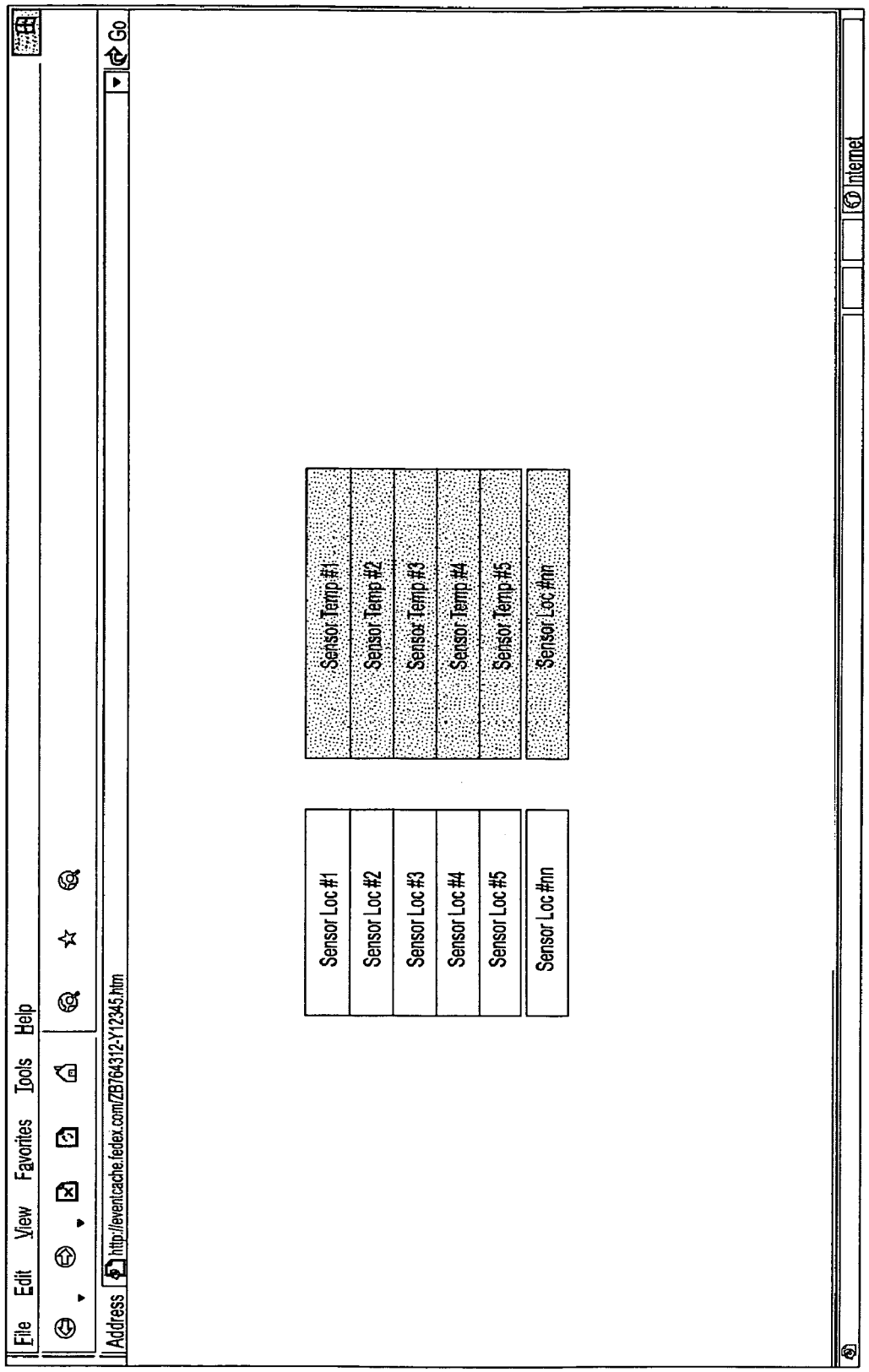
FIG. 5 is an exemplary graphical user interface displaying sensor data retrieved in response to a request for sensor data, consistent with an embodiment of the present invention.

FIG. 5 is an exemplary graphical user interface displaying sensor data retrieved in response to a request for sensor data, consistent with an aspect of the present invention. One skilled in the art will appreciate that alternative user interfaces may be utilized that display retrieved sensor data in different ways.

The user interface, for example, may be displayed on a client 110 or other client or workstation that is being utilized by a user to request sensor data from tracking center 108. In the example of FIG. 5, the request for sensor data has taken the form of a uniform resource locator (URL) entered by the user in the address window of a web browser program. The URL indicates, for example, that all sensor data corresponding to a sensor identified as ZB764312-Y12345 should be retrieved from sensor information database 204. In other words, the user in this case has requested all sensor data from the aforementioned sensor. In the present example, the user may be requesting the sensor data directly from tracking center 108 without the use of an intermediate search engine.

In the context of the flow chart depicted in FIG. 4, the triggering parameter for this request is the ID number of the sensor, ZB764312-Y12345, so that all sensor data meeting that triggering parameter has been requested. In response, tracking center 108 may return a web page listing the relevant sensor data to the web browser program. In this case, tracking center 108 returned location information and temperature information for the identified sensor. One of ordinary skill in the art will appreciate that the various labels depicted in the user interface of FIG. 5 (e.g., "Sensor Loc #1," "Sensor Temp #1," etc.), are replaced by the relevant values in actual use. One of ordinary skill in the art will also appreciate that requested sensor data may be provided to a user using means other than a web page. For example, results may be provided to a user in a file.

Figure 6:
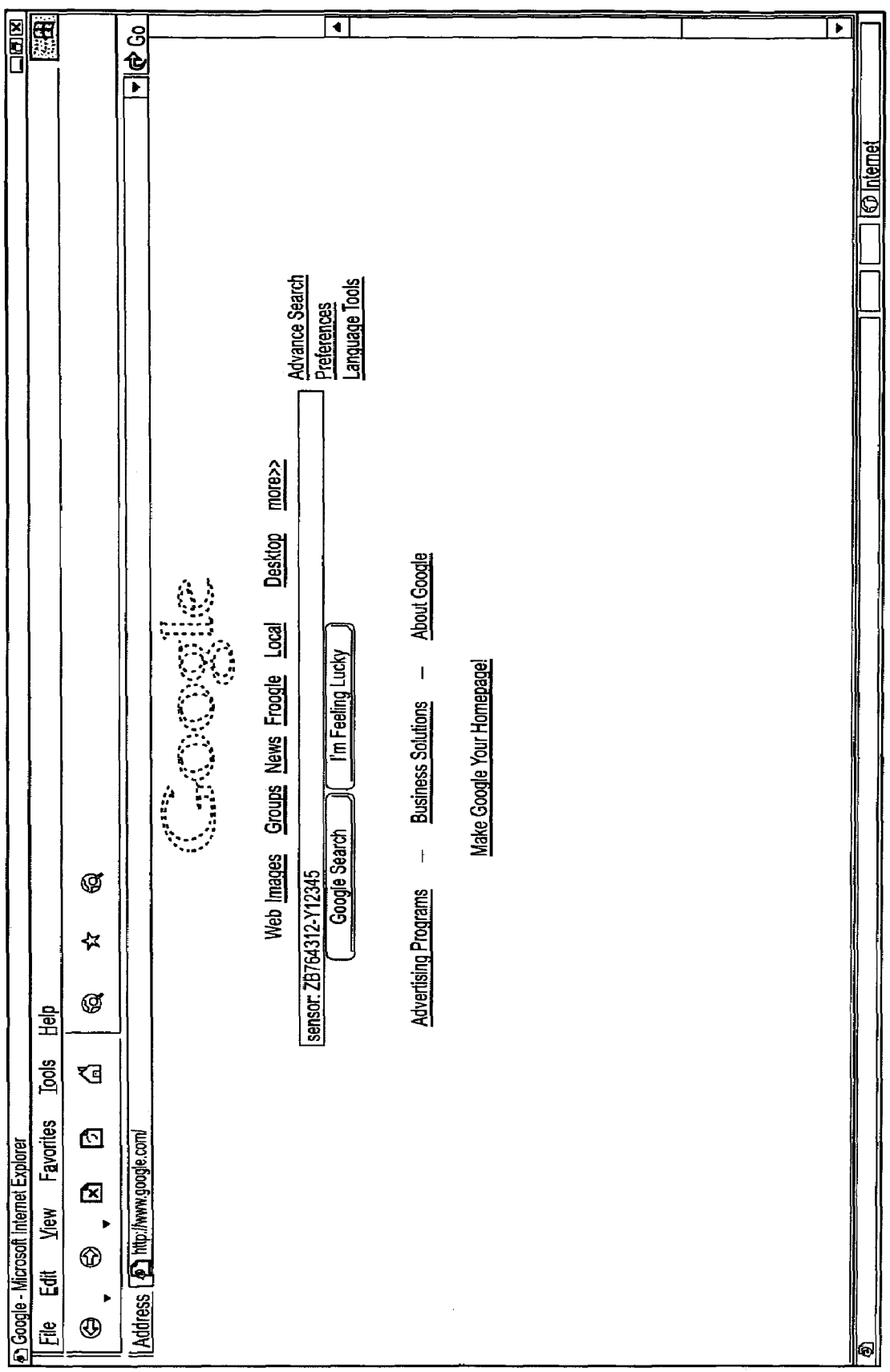
FIG. 6 is an exemplary graphical user interface for searching for sensor data, consistent with an embodiment of the present invention.

FIG. 6 is an exemplary graphical user interface for searching for sensor data, consistent with the principles of the present invention. Instead of requesting sensor data directly from tracking center 108, a user may first search for hyperlinks to web pages with the requested data. The example depicted in FIG. 6 shows that a user may utilize a search engine, such as the one made available by Google™, to search for sensor data pertaining to a sensor identified as ZB764312-Y12345. One of ordinary skill in the art will appreciate that even though the user is not directly requesting sensor data from tracking center 108, the sought after sensor data still resides at tracking center 108.

Figure 7:
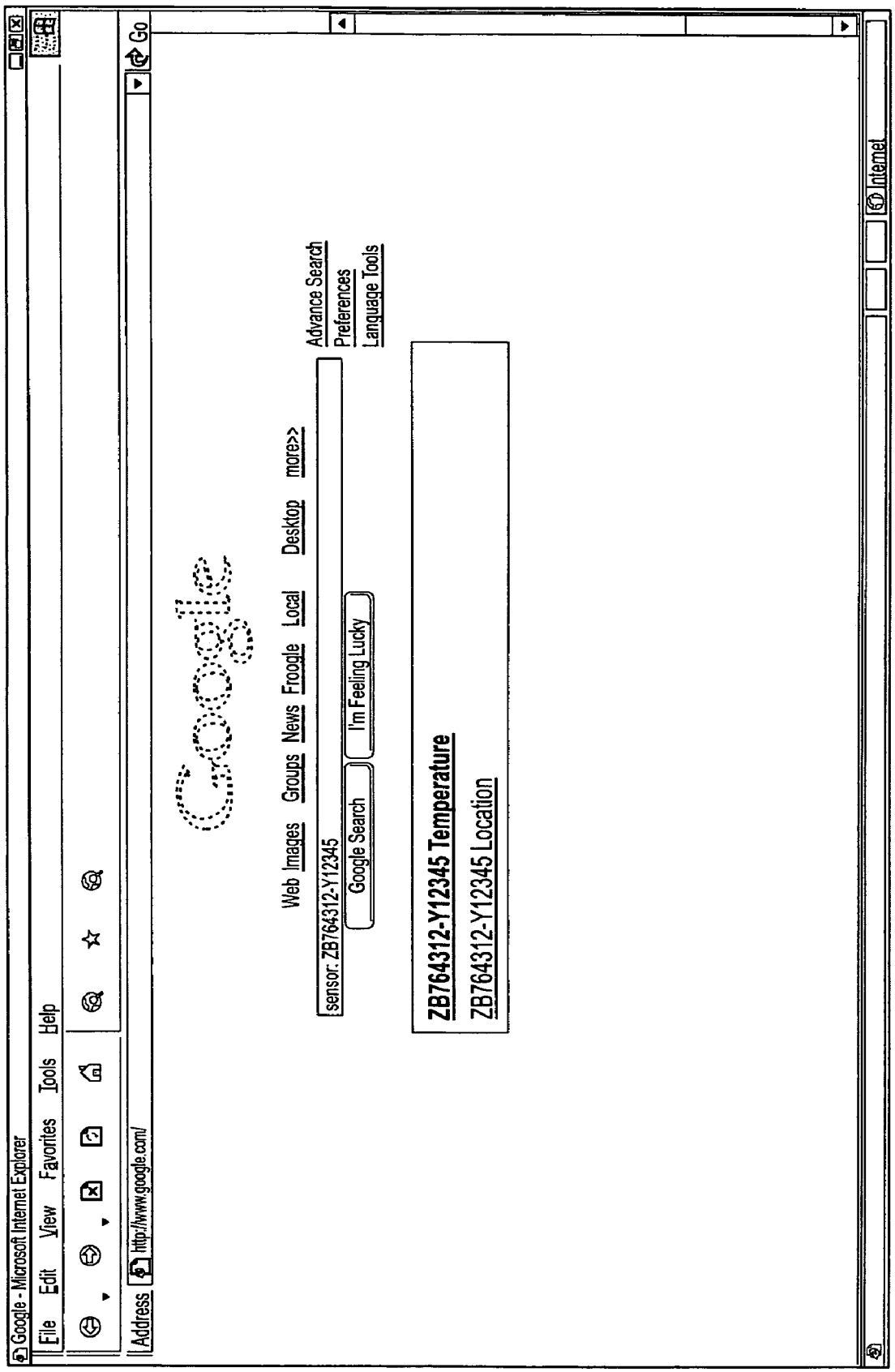
FIG. 7 shows exemplary search results of the search performed in FIG. 6, consistent with an embodiment of the present invention.

FIG. 7 shows exemplary search results of the search performed in FIG. 6. Specifically, the search resulted in hyperlinks to two web pages. One is a link to temperature information for sensor ZB764312-Y12345. The other is a link to location information for sensor ZB764312-Y12345. Clicking on the temperature link for example, may result in a request for temperature information for sensor ZB764312-Y12345 being sent to tracking center 108, where the information may be retrieved from sensor information database 204. In the context of the flow chart depicted in FIG. 4, the triggering parameter for this request is the ID number of the sensor, ZB764312-Y12345, so that all temperature information meeting that triggering parameter has been requested. In response, tracking center 108 may return a web page listing the relevant temperature information to the web browser program. One of ordinary skill in the art will appreciate that requested sensor data may be provided to a user using means other than a web page. For example, results may be provided to a user in a file.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for tracking items, comprising:
storing, in memory, first association data reflecting an association between an item tracking device and a beacon device when the item tracking device is within a predetermined range of the beacon device, wherein the item tracking device corresponds to a first item, and the beacon device corresponds to an area that contains multiple items including the first item;
detecting sensor data about an environment of the beacon device;
associating the sensor data with a group of items, of the multiple items, that are within the predetermined range of the beacon device; and
periodically transmitting the associated sensor data from the beacon device to a database.

2. The method of claim 1, further comprising:
associating the item tracking device with another beacon device if the item tracking device is within a predetermined range of said another beacon device.

3. The method of claim 1, wherein the sensor data includes at least one of location information, temperature information, humidity information, light level information, pressure information, photo information, and video information.

4. The method of claim 1, wherein the transmitted sensor data triggers an alarm.

5. The method of claim 4, wherein triggering the alarm comprises sending a notification to a tracking center in response to a predetermined condition.

6. The method of claim 4, wherein triggering the alarm comprises sending a notification to a user tracking device in response to a predetermined condition.

7. The method of claim 1, wherein the transmitted sensor data triggers a programming change for at least one of the item tracking device and the beacon device.

8. The method of claim 1, further comprising: associating an item tracking number with the item tracking device.

9. The method of claim 1, wherein the area that contains the multiple items is a vehicle used to deliver the multiple items.

10. The method of claim 1, wherein the area that contains the Multiple items is a storage facility used to store the multiple items.

11. The method of claim 1, wherein the area that contains the multiple items Is a container used to hold the multiple items.

12. The method of claim 1, further comprising:
storing second association data reflecting an association between the item tracking device and a user tracking device when the item tracking device is within a predetermined range of the user tracking device, wherein the user tracking device corresponds to a courier responsible for delivering the first item.

13. The method of claim 1, further comprising:
disassociating the item tracking device from the beacon device when the item tracking device is outside the predetermined range; and
updating the memory to reflect the disassociation.

14. The method of claim 1, wherein the sensor data Is transmitted directly from the item tracking device to the database.

15. A system for tracking items, comprising:
at least one item tracking device, the at least one item tracking device corresponding to an item to be tracked;
at least one beacon device that corresponds to an area that contains multiple items including the item to be tracked, the beacon device comprising:

a sensor that detects sensor data about an environment of the beacon device;

memory that stores first association data reflecting an association between the at least one item tracking device and the at least one beacon device; and a processor that associates the sensor data with a group of items, of the multiple items, which are within the predetermined range of the beacon device; and a tracking center operable to periodically receive the associated sensor data from the at least one beacon device.

16. The system of claim 15, wherein the at least one item tracking device is associated with another beacon device if the at least one item tracking device is within the predetermined range of said another beacon device.

17. The system of claim 15, wherein the sensor data includes at least one of location information, temperature information, humidity information, light level information, pressure information, photo information, and video information.

18. The system of claim 15, wherein the reported sensor data triggers an alarm.

19. The system of claim 18, wherein triggering the alarm comprises sending a notification to a tracking center in response to a predetermined condition.

20. The system of claim 18, wherein triggering the alarm comprises sending a notification to a user tracking device in response to a predetermined condition.

21. The system of claim 15, wherein the area that contains the multiple items is a vehicle used to deliver the multiple items.

22. The system of claim 15, wherein the area that contains the multiple items is a storage facility used to store the multiple items.

23. The system of claim 15, wherein the area that contains the multiple items is a container used to hold the multiple items.

24. The system of claim 15, further comprising:

a user tracking device that corresponds to a courier responsible for delivering the item to be tracked, the user tracking device storing second association data reflecting an association between the at least one item tracking device and the user tracking device when the at least one item tracking device is within a predetermined range of the user tracking device.

25. A computer-readable medium containing instructions, which, when executed by a processor, cause the processor to perform a method for tracking items, the method comprising:

storing, in memory, first association data reflecting an association between an item tracking device and a beacon device when the item tracking device is within a predetermined range of the beacon device, wherein the item tracking device corresponds to a first item, and the beacon device corresponds to an area that contains multiple items including the first item;

detecting sensor data about an environment of the beacon device;

associating the sensor data with a group of items, of the multiple items, which are within the predetermined range of the beacon device; and periodically transmitting the associated sensor data from the beacon device to a database.

* * * * *